United States Patent
Yang et al.

(10) Patent No.: US 9,771,471 B2
(45) Date of Patent: Sep. 26, 2017

(54) LATEX COMPOSITION FOR DIP MOLDING AND DIP-MOLDED ARTICLE PRODUCED THEREFROM

(71) Applicant: LG CHEM, LTD., Seoul (KR)

(72) Inventors: Seung Hun Yang, Daejeon (KR); Byoung Yun Kim, Daejeon (KR); Jung Eun Kim, Daejeon (KR); Seung Uk Yeu, Daejeon (KR); Jung Su Han, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/371,372

(22) PCT Filed: Dec. 18, 2013

(86) PCT No.: PCT/KR2013/011836
§ 371 (c)(1),
(2) Date: Jul. 9, 2014

(87) PCT Pub. No.: WO2014/142425
PCT Pub. Date: Sep. 18, 2014

(65) Prior Publication Data
US 2015/0225553 A1    Aug. 13, 2015

(30) Foreign Application Priority Data

Mar. 15, 2013 (KR) .................. 10-2013-0027635
Dec. 3, 2013 (KR) .................. 10-2013-0149342

(51) Int. Cl.

| | | |
|---|---|---|
| C08L 13/02 | (2006.01) | |
| B29C 41/14 | (2006.01) | |
| C08L 3/00 | (2006.01) | |
| C08L 9/04 | (2006.01) | |
| B29C 41/00 | (2006.01) | |
| B29K 33/18 | (2006.01) | |
| B29L 31/48 | (2006.01) | |

(52) U.S. Cl.
CPC .............. *C08L 13/02* (2013.01); *B29C 41/14* (2013.01); *C08L 3/00* (2013.01); *C08L 9/04* (2013.01); *B29C 41/003* (2013.01); *B29K 2033/18* (2013.01); *B29L 2031/4864* (2013.01)

(58) Field of Classification Search
CPC ... B29C 41/14; B29C 41/003; B29K 2033/18; B29L 2031/4864; C08L 13/02; C08L 3/00; C08L 9/04
See application file for complete search history.

(56) References Cited

U.S. PATENT DOCUMENTS

| | | | | |
|---|---|---|---|---|
| 6,677,386 | B1 * | 1/2004 | Giezen | C08B 30/12 106/206.1 |
| 2002/0111431 | A1 * | 8/2002 | Kajiwara | C08L 13/02 525/162 |
| 2006/0251819 | A1 * | 11/2006 | Zama et al. | 427/384 |
| 2011/0224362 | A1 * | 9/2011 | Westerman | C08F 236/12 524/565 |
| 2012/0263894 | A1 * | 10/2012 | Bloembergen | D21H 17/28 428/32.21 |

FOREIGN PATENT DOCUMENTS

| | | |
|---|---|---|
| CN | 1517393 A | 8/2004 |
| CN | 1938373 A | 3/2007 |
| JP | 11-061527 | 3/1999 |
| KR | 10-2011-0053980 | 2/2011 |
| KR | 10-2012-0069222 | 6/2012 |
| KR | 10-2012-0086927 | 8/2012 |
| WO | 2005/095508 | 10/2005 |

OTHER PUBLICATIONS https://en.wikipedia.org/wiki/Starch, Jan. 2004.*
Qian Jin, et al.: "Technology Test of NBR Latex Industry Gloves", Special Purpose Rubber Products, vol. 21(4), 2000, pp. 36-37, 46.

* cited by examiner

*Primary Examiner* — Satya Sastri
(74) *Attorney, Agent, or Firm* — Dentons US LLP

(57) ABSTRACT

Disclosed is a latex composition for dip molding comprising a carboxylic acid-modified nitrile copolymer latex and starch and an article produced therefrom. Advantageously, a dip-molded article having low syneresis, less stickiness and superior tensile strength can be obtained by using the carboxylic acid-modified nitrile latex in conjunction with starch.

9 Claims, No Drawings

LATEX COMPOSITION FOR DIP MOLDING AND DIP-MOLDED ARTICLE PRODUCED THEREFROM

This application is a National Stage Entry of International Application No. PCT/KR2013/011836, filed Dec. 18, 2013, and claims the benefit of Korean Application No. 10-2013-0027635 filed on Mar. 15, 2013, and Korean Application No. 10-2013-0149342, filed Dec. 3, 2013, all of which are hereby incorporated by reference in their entirety for all purposes as if fully set forth herein.

TECHNICAL FIELD

The present invention relates to a latex composition for dip molding and a dip-molded article produced therefrom. More specifically, the present invention relates to a latex composition for dip molding which comprises a carboxylic acid-modified nitrile copolymer latex and starch, and thus enables production of articles which exhibit excellent workability during dip-molding, are not sticky and have superior tensile strength, and an article produced therefrom.

BACKGROUND ART

In recent years, glove manufacturers continuously make a great deal of effect to reduce weight of nitrile rubber gloves. Gloves should be thinly produced in order to reduce weight thereof. A latex composition concentration should be reduced in order to make gloves thin. As a result, syneresis seriously occurs in the formation of glove films, thus causing a great increase in pinholes in final gloves.

In addition, the manufactured gloves have problems of excessive stickiness and deteriorated tensile strength. Accordingly, glove manufacturers intensively research carboxylic acid-modified nitrile latexes which prevent serious syneresis, is free of stickiness of final gloves and does not deteriorate tensile strength, although gloves with a small thickness are manufactured. However, carboxylic acid-modified nitrile latexes satisfying all of these requirements have not been found to date.

DISCLOSURE

Technical Problem

Therefore, the present invention has been made in view of the above problems of the prior art, and it is one object of the present invention to provide a carboxylic acid-modified nitrile copolymer latex composition which enables production of articles which have lower syneresis, less stickiness and superior tensile strength than conventional dip-molded articles.

It is another object of the present invention to provide a dip-molded article produced from the carboxylic acid-modified nitrile copolymer latex composition.

The objects of the present invention can be accomplished by the present invention described below.

Technical Solution

Therefore, in accordance with an aspect of the present invention, the above and other objects can be accomplished by the provision of a latex composition for dip molding comprising a carboxylic acid-modified nitrile copolymer latex and starch.

The present invention solves the problems of the prior art by mixing 85 to 98% by weight of a carboxylic acid-modified nitrile copolymer latex having a glass transition temperature of −50° C. to −15° C. and an average particle diameter of 50 nm or more with 2 to 15% by weight of starch having a viscosity of 300 cPs or less at a temperature of 50° C. and at a concentration of 30% by weight and incorporating the resulting mixture into a latex composition for dip molding.

Advantageous Effects

In accordance with the present invention, a latex composition is prepared by mixing a carboxylic acid-modified nitrile copolymer latex and starch, thereby enabling production of articles which exhibit excellent workability during dip-molding and have low syneresis, less stickiness and superior tensile strength.

BEST MODE

The carboxylic acid-modified nitrile copolymer latex composition for dip molding according to the present invention comprises a carboxylic acid-modified nitrile copolymer latex and starch.

The carboxylic acid-modified nitrile copolymer latex has a glass transition temperature of −50° C. to −15° C.

In another example, the carboxylic acid-modified nitrile copolymer latex may have a glass transition temperature of −45° C. to −20° C. Within this range, tensile strength is excellent and dip-molded articles do not crack.

In addition, the carboxylic acid-modified nitrile copolymer latex may have an average particle diameter of 50 nm or more.

In another example, the carboxylic acid-modified nitrile copolymer latex may have an average particle diameter of 50 nm to 500 nm, 50 nm to 300 nm, or 60 nm to 200 nm. Within this range, the viscosity of latex does not increase, thus enabling production of latex at a high concentration and preventing deterioration in tensile strength after manufacturing of gloves.

The glass transition temperature and the average particle diameter of the latex corresponding to a glass transition temperature and an average particle diameter of the polymer contained in the latex.

The average particle diameter is a weight average particle diameter.

In addition, the starch may have viscosity of 300 cPs or less at a temperature of 50° C. and at an aqueous starch solution concentration of 30% by weight.

The latex composition for dip molding according to the present invention may, for example, comprise the carboxylic acid-modified nitrile copolymer latex and the starch in a weight ratio of 70:30 to 99.9:0.1, 75:25 to 99:1, 81:19 to 99:1, or 98:2 to 85:15.

Within this range, there are effects in that syneresis time is greatly increased and dip-molded articles have less stickiness and superior tensile strength.

In addition, the latex composition for dip molding comprising the carboxylic acid-modified nitrile copolymer latex according to the present invention may further comprise, in addition to the carboxylic acid-modified nitrile copolymer latex, one or more additives selected from the group consisting of a vulcanizing agent, an ionic crosslinking agent, a pigment, a vulcanizing accelerator, a filler, a thickener and a pH controller.

In addition, the dip-molded article according to the present invention is obtained by dip-molding the latex composition for dip molding.

In another example, the dip-molded article according to the present invention is produced by adding an emulsifier, a polymerization initiator, a molecular weight adjuster and the like to respective monomers constituting a latex to produce the latex, preparing starch having a concentration of 20 to 40% by weight or 25 to 35% by weight via separate route at a temperature of 70 to 90° C., or 75 to 85° C., mixing the prepared latex with the starch at a temperature 40 to 60° C., or 45 to 55° C. to prepare a carboxylic acid nitrile latex composition, and dip-molding the carboxylic acid nitrile latex composition to obtain a final protect.

Hereinafter, the latex, starch, the mixed carboxylic acid-modified nitrile copolymer latex and the latex composition comprising the latex used for obtaining the dip-molded article will be described in detail.

1. Carboxylic Acid-Modified Nitrile Copolymer Latex

The latex according to the present invention is for example prepared by adding an emulsifier, a polymerization initiator, a molecular weight controller and other additives to respective monomers constituting a carboxylic acid-modified nitrile copolymer, followed by emulsion polymerization.

The monomers constituting the carboxylic acid-modified nitrile copolymer include a conjugated diene monomer, an ethylenically unsaturated nitrile monomer and an ethylenically unsaturated acid monomer.

The carboxylic acid-modified nitrile copolymer may further include an ethylenically unsaturated monomer copolymerizable with the monomers.

Specifically, the conjugated diene monomer constituting the carboxylic acid-modified nitrile copolymer according to the present invention comprises at least one selected from the group consisting of 1,3-butadiene, 2,3-dimethyl-1,3-butadiene, 2-ethyl-1,3-butadiene, 1,3-pentadiene and isoprene. 1,3-butadiene and isoprene are preferred and, in particular, 1,3-butadiene is most preferred.

The conjugated diene monomer is, for example, present in an amount of 40 to 89% by weight, specifically 45 to 80% by weight, most specifically 50 to 78% by weight, based on the total weight of the monomers constituting the carboxylic acid-modified nitrile copolymer. Within this range, dip-molded articles are soft and exhibit superior wearing sensation, and excellent oil resistance and tensile strength.

The ethylenically unsaturated nitrile monomer as another monomer constituting the carboxylic acid-modified nitrile copolymer according to the present invention comprises at least one selected from the group consisting of acrylonitrile, methacrylonitrile, fumaronitrile, α-chloronitrile and α-cyanoethylacrylonitrile. Of these, acrylonitrile and methacrylonitrile are preferred and, in particular, acrylonitrile is most preferred.

The ethylenically unsaturated nitrile monomer is present in an amount of 10 to 50% by weight, specifically 15 to 45% by weight, most specifically 20 to 40% by weight, based on the total weight of the monomers constituting the carboxylic acid-modified nitrile copolymer. Within this range, dip-molded articles exhibit superior oil resistance and tensile strength, are soft and have superior wearing sensation.

The ethylenically unsaturated acid monomer, as another monomer constituting the carboxylic acid-modified nitrile copolymer according to the present invention, has at least one acid group selected from the group consisting of carboxyl, sulfonic acid and acid anhydride groups. Examples of the ethylenically unsaturated acid monomer include: ethylenically unsaturated carboxylic acid monomers such as acrylic acid, methacrylic acid, itaconic acid, maleic acid and fumaric acid; polycarboxylic acid anhydrides such as maleic anhydride and citraconic anhydride; ethylenically unsaturated sulfonic acid monomers such as styrenesulfonic acid; and partial ester monomers of ethylenically unsaturated polycarboxylic acids such as monobutyl fumarate, monobutyl maleate and mono-2-hydroxypropyl maleate. Of these, methacrylic acid is particularly preferred. The ethylenically unsaturated acid monomer may be used in the form of an alkali metal salt or an ammonium salt.

The ethylenically unsaturated acid monomer is, for example, present in an amount of 0.1 to 10% by weight, 0.5 to 9% by weight, or 1 to 8% by weight, based on the total weight of the monomers constituting the carboxylic acid-modified nitrile copolymer. Within this range, dip-molded articles exhibit superior tensile strength and are soft and have excellent wearing sensation.

The carboxylic acid-modified nitrile copolymer according to the present invention may optionally further comprise another ethylenically unsaturated monomer copolymerizable with these monomers. For example, the copolymerizable ethylenically unsaturated monomer comprises at least one selected from the group consisting of: vinyl aromatic monomers from the group consisting of styrene, alkylstyrene and vinyl naphthalene; fluoroalkyl vinyl ethers such as fluoroethyl vinyl ether; ethylenically unsaturated amide monomers from the group consisting of (meth) acrylamide, N-methylol (meth) acrylamide, N,N-dimethylol (meth) acrylamide, N-methoxymethyl (meth)acrylamide and N-propoxymethyl (meth)acrylamide; non-conjugated diene monomers such as vinyl pyridine, vinyl norbornene, dicyclopentadiene and 1,4-hexadiene; and ethylenically unsaturated carboxylic acid ester monomers such as methyl (meth) acrylate, ethyl (meth)acrylate, butyl (meth)acrylate, 2-ethylhexyl (meth)acrylate, trifluoroethyl (meth) acrylate, tetrafluoropropyl (meth) acrylate, dibutyl maleate, dibutyl fumarate, diethyl maleate, methoxymethyl (meth) acrylate, ethoxyethyl (meth) acrylate, methoxyethoxyethyl (meth) acrylate, cyanomethyl (meth)acrylate, 2-cyanoethyl(meth) acrylate, 1-cyanopropyl (meth)acrylate, 2-ethyl-6-cyanohexyl (meth)acrylate, 3-cyanopropyl (meth) acrylate, hydroxyethyl (meth) acrylate, hydroxypropyl (meth)acrylate, glycidyl (meth)acrylate and dimethylaminoethyl (meth) acrylate.

The ethylenically unsaturated monomer copolymerizable with these monomers may be for example used in an amount of 20% by weight, or 0.01 to 20% by weight with respect to the total weight of the monomers constituting the carboxylic acid-modified nitrile copolymer. Within this range, advantageously, a balance between softness and tensile strength is obtained.

In another embodiment, the carboxylic acid-modified nitrile copolymer latex may be prepared by adding an emulsifier, a polymerization initiator, an activator, a molecular weight controller and the like to the monomers constituting the carboxylic acid-modified nitrile copolymer, followed by emulsion polymerization.

Examples of the emulsifier include, but are not particularly limited to, anionic surfactants, nonionic surfactants, cationic surfactants and amphoteric surfactants. The surfactant is particularly preferably an anionic surfactant selected from the group consisting of alkylbenzene sulfonates, aliphatic sulfonates, sulfate esters of higher alcohols, α-olefin sulfonates and alkyl ether sulfate esters. The emulsifier is preferably used in an amount of 0.3 to 10 parts by weight, 0.8 to 8 parts by weight, or 1.5 to 6 parts by weight, based on 100 parts by weight of the monomers constituting the carboxylic acid-modified nitrile copolymer.

When the emulsifier is used in an amount of less than 0.3 parts by weight, polymerization stability is deteriorated, and when the emulsifier is used in an amount exceeding 10 parts by weight, foams are greatly produced, thus making production of dip-molded articles difficult.

The kind of the polymerization initiator is not particularly limited. The polymerization initiator is preferably a radical initiator. The radical initiator comprises at least one from the group consisting of: inorganic peroxides such as sodium persulfate, potassium persulfate, ammonium persulfate, potassium perphosphate and hydrogen peroxide; organic peroxides such as t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide and t-butylperoxy isobutyrate; azobisisobutyronitrile; azobis-2,4-dimethylvaleronitrile; azobiscyclohexane carbonitrile; and methyl azobisisobutyrate. Of the radical initiators, inorganic peroxides are more preferred and persulfates are particularly preferred.

The polymerization initiator is, for example, used in an amount of 0.01 to 2 parts by weight, 0.02 to 1.5 parts by weight or 0.05 to 1.0 part by weight, based on 100 parts by weight in total of the monomers constituting the carboxylic acid-modified nitrile copolymer. Within this range, final products can be easily obtained by control of polymerization rate and polymerizations stability is excellent.

The activator comprises at least one selected from the group consisting of sodium formaldehyde sulfoxylate, sodium ethylenediaminetetraacetate, ferrous sulfate, dextrose, sodium pyrophosphate, and sodium sulfite.

Examples of the molecular weight modifier include, but are not particularly limited to: α-methylstyrene dimers; mercaptans such as t-dodecyl mercaptan, n-dodecyl mercaptan and octyl mercaptan; halogenated hydrocarbons such as carbon tetrachloride, methylene chloride and methylene bromide; and sulfur-containing compounds such as tetraethylthiuram disulfide, dipentamethylenethiuram disulfide and diisopropylxanthogene disulfide. The molecular weight modifier may be used alone or in combination of two or more thereof. Of these, mercaptans are preferred and t-dodecyl mercaptan is more preferred. The amount of the molecular weight modifier used may vary depending on the kind thereof. The amount of the molecular weight modifier is 0.1 to 2.0 parts by weight, 0.2 to 1.5 parts by weight, or 0.3 to 1.0 parts by weight, with respect to 100 parts by weight in total of the monomers constituting the carboxylic acid-modified nitrile copolymer. Within this range, there are effects in that physical properties of dip-molded articles and polymerization stability are significantly improved.

If necessary, one or more minor ingredients such as chelating agents, dispersants, pH-adjusting agents, oxygen absorbers, particle size modifiers, antioxidants, and oxygen scavengers can be further added in the polymerization of the latex according to the present invention.

There are a variety of methods for adding the mixture of the monomers constituting the carboxylic acid-modified nitrile copolymer. For example, the mixture of the monomers may be added to a polymerization reactor in one portion or in successive portions. Alternatively, after a portion of the monomer mixture is added to a polymerization reactor, the remainder is added successively to the polymerization reactor.

A polymerization temperature upon the emulsion polymerization is not particularly limited and is for example 10 to 90° C., 20 to 80° C., or 25 to 75° C.

Polymerization is stopped when polymerization conversion reaches a predetermined level, for example at least 90%, 90% to 99.9%, or 93% to 99%.

The carboxylic acid-modified nitrile copolymer latex may be obtained by removing unreacted monomers and adjusting solid content and pH to desired levels.

The glass transition temperature may be adjusted according to the content of the conjugated diene monomer, and average particle diameter and particle diameter distribution may be adjusted according to type or content of the emulsifier.

The latex glass transition temperature is measured by differential scanning calorimetry and the average particle diameter is measured with a laser scattering analyzer (Nicomp).

The carboxylic acid-modified nitrile copolymer latex has for example a solid content (concentration) of 20 to 70% by weight, 30 to 60% by weight, or 40 to 50% by weight.

2. Starch

The starch according to the present invention may be selected from commercially available products and have, for example, a viscosity of 300 cPs or less at a temperature of 50° C. and at an aqueous starch solution concentration of 30% by weight. The viscosity may be, for example, measured using a Brookfield viscometer.

The starch is, for example, a mixture of amylose and amylopectin. In another example, the starch may be a mixture containing 0 to 40% by weight of amylose and 60 to 100% by weight of amylopectin, or a mixture containing 10 to 30% by weight of amylose and 70 to 90% by weight of amylopectin.

In another example, the viscosity of the starch at a temperature of 50° C. and at a concentration of 30% by weight may be 10 cPs to 300 cPs. When the viscosity of starch is 300 cPs or less, production of dip-molded articles is easy because viscosity is not increased even after mixing of the latex.

The starch is, for example, a starch solution or a starch suspension.

The starch solution is, for example, an aqueous starch solution.

The starch suspension is, for example, a suspension in which starch is dispersed in water.

The starch solution or the starch suspension may, for example, have a concentration of 0.1 to 60% by weight, 1 to 55% by weight, 10 to 45% by weight, or 20 to 40% by weight. Within this range, syneresis is low, stickiness is less and tensile strength is excellent.

The starch may be, for example, extracted from a variety of crops such as rice, wheat, corn, potato, sweet potato and tapioca.

3. Latex Composition for Dip Molding

For example, the latex composition for dip molding may be prepared by adding one or more additives selected from the group consisting of a vulcanizing agent, an ionic cross-linking agent, a pigment such as titanium oxide, a filler such as silica, a thickener and a pH controller such as ammonium or alkali hydroxide to the mixture of the latex and the starch obtained by the method described above.

The carboxylic acid-modified nitrile copolymer latex is preferably present in an amount of 80 to 99% by weight, to 98% by weight, or 88 to 97% by weight, in the composition, in view of physical properties of gloves which are a type of dip-molded articles.

The latex composition for dip molding may for example have a solid content of 5 to 40% by weight, 8 to 35% by weight, or 10 to 33% by weight. The latex composition for dip molding according to the present invention may for example have a pH of 8.0 to 12, 9 to 11 or 9.3 to 10.5.

4. Dip-Molded Article

The dip-molded article of the present invention may be produced by an ordinary dip molding method. Examples of the dip molding method include direct dipping, anode coagulation dipping and Teague's coagulation dipping methods. Anode coagulation dipping is preferred because the dip-molded article with a uniform thickness can be easily produced. The dip-molded article may be a surgical glove, an examination glove, a condom, a catheter, an industrial article, a household glove or a health care article.

Hereinafter, a method for preparing a dip-molded article using the latex composition of the present invention will be described stepwise in detail.

(a) Dipping Hand-Shaped Mold for Dip Molding in Coagulant Solution to Adhere Coagulant to Mold Surface Examples of the coagulant include: metal halides such as barium chloride, calcium chloride, magnesium chloride, zinc chloride and aluminum chloride; nitrates such as barium nitrate, calcium nitrate and zinc nitrate; acetates such as barium acetate, calcium acetate and zinc acetate; and sulfates such as calcium sulfate, magnesium sulfate and aluminum sulfate. Of these, calcium chloride and calcium nitrate are preferred. The coagulant solution is prepared by dissolving the coagulant in water, alcohol or a mixture thereof. The concentration of the coagulant in the coagulant solution is typically 5 to 75% by weight, or 8 to 55% by weight.

(b) Dipping Coagulant-Adhered Mold in Latex Resin Composition of the Present Invention to Form Dip-Molded Layer Then, the mold, to which the coagulant is adhered, is dipped in the latex composition for dip molding according to the present invention. Then, the mold is taken out of the latex composition to form a dip-molded layer on the mold.

(c) Heating Dip-Molded Layer Formed on Mold to Cross-link Latex Resin

During heating, syneresis time is for example obtained by measuring a time until which water is expelled from the mold for dip molding. When water drops are expelled from the mold within one minute, the composition for dip molding may be contaminated in the process field. Accordingly, it is preferred that water drops are not ex-expelled from the mold within one minute.

During heating, water first evaporates and curing then occurs through cross-linking. Then, the cross-linked dip-molded layer is peeled from the mold for dip molding to obtain a dip-molded article. Stickiness of the dip-molded article on the hand upon peeling of the dip-molded article may be evaluated on a scale of 1 to 10. In this case, 10 represents least sticky such that the article is easily peeled from the mold for dip molding and 1 represents maximum (serious) stickiness such that the article cannot be peeled from the mold for dip molding.

(d) Measuring Physical Properties of Obtained Dip-Molded Article

A dumbbell-shaped specimen was produced from the dip-molded article in accordance with ASTM D-412. Then, the specimen was drawn at an elongation rate of 500 mm/min using a universal testing machine (UTM), and tensile strength at break was measured.

Hereinafter, preferred examples will be provided for better understanding of the present invention. It will be apparent to those skilled in the art that the following examples are only provided to illustrate the present invention, and various modifications and alternations are possible within the scope and technical range of the present invention. Such modifications and alternations fall within the scope of claims included herein.

EXAMPLE

Example 1

After an atmosphere of a 10 L high-pressure reactor being equipped with a stirrer, a thermometer, a cooler, and an inlet and an outlet of nitrogen gas, and allowing for continuous addition of monomers, an emulsifier and a polymerization initiator was replaced with nitrogen, 2.5 parts by weight of alkyl benzene sodium sulfonate, 0.5 parts by weight of t-dodecyl mercaptan and 140 parts by weight of ion exchanged water were added to 100 parts by weight of a monomer mixture comprising 25% by weight of acrylonitrile, 70% by weight of 1,3-butadiene and 5% by weight of methacrylic acid and a temperature of the reactor was elevated to 40° C.

After the temperature elevation, 0.25 parts by weight of potassium persulfate as a polymerization initiator was added to the resulting mixture, and 0.1 parts by weight of sodium dimethyl dithiocarbamate was added thereto when conversion ratio reached 95% to stop polymerization. Unreacted monomers were removed by deodorization, and aqueous ammonia, an antioxidant, a defoaming agent and the like were added to obtain a carboxylated acrylonitrile-butadiene copolymer latex having a solid content of 45% and a pH of 8.5.

As a result of analysis of latex, the latex was determined to have a glass transition temperature of −40° C. and an average particle diameter of 130 nm. Hereinafter, the latex thus prepared will be referred to as "latex-A".

Then, a commercially available starch, which is generally used for paper coating, (Gencoat available from Samyang Genex Corporation) was prepared at a concentration of 30% by weight at a temperature of 80° C. and had a viscosity at a temperature of 50° C., of 252c Ps. The starch will be referred to as "starch-A".

The latex-A and the starch-A were mixed at a ratio of 9:1 to prepare a mixture.

(Preparation of Composition for Dip Molding)

A 3% potassium hydroxide solution and a reasonable amount of double distilled water were added to the mixture to obtain a composition for dip molding having a solid content of 15% and a pH of 10.0.

(Production of Dip-Molded Article)

12 parts by weight of calcium nitrate, 87.5 parts by weight of distilled water, and 0.5 parts by weight of a wetting agent (Teric 320 produced by Huntsman Corporation, Australia) were mixed to prepare a coagulant solution. A hand-shaped ceramic mold was dipped in this solution for one minute, was then taken out and dried at 80° C. for 3 minutes to attach the coagulant to the hand-shaped mold.

Then, the coagulant-applied mold was dipped in the composition for dip molding for one minute, taken out, dried at 120° C. for 4 minutes and was then dipped in water or warm water for 3 minutes. A syneresis time was determined as a time at which water drops are expelled during the drying at 120° C. for 4 minutes. The mold was dried at 120° C. for 3 minutes again and cross-linked at 130° C. for 20 minutes. The cross-linked dip-molded layer was peeled from the hand-shaped mold and at this time, stickiness was measured, and a glove-shaped dip-molded article was obtained. The syneresis time, stickiness and tensile strength are shown in Table 1 below.

Example 2

After an atmosphere of a 10 L high-pressure reactor being equipped with a stirrer, a thermometer, a cooler, and an inlet and an outlet of nitrogen gas, and allowing for continuous addition of monomers, an emulsifier and a polymerization initiator was replaced with nitrogen, 3 parts by weight of alkyl benzene sodium sulfonate, 0.5 parts by weight of t-dodecyl mercaptan and 140 parts by weight of ion exchanged water were added to 100 parts by weight of a monomer mixture comprising 35% by weight of acrylonitrile, 60% by weight of 1,4-butadiene and 5% by weight of methacrylic acid and a temperature of the reactor was elevated to 40° C.

After the temperature elevation, 0.3 parts by weight of potassium persulfate as a polymerization initiator was added to the resulting mixture, and 0.1 parts by weight of sodium dimethyl dithiocarbamate was added thereto when conversion ratio reached 95% to stop polymerization. Unreacted monomers were removed by deodorization, and aqueous ammonia, an antioxidant, a defoaming agent and the like were added to obtain a carboxylated acrylonitrile-butadiene copolymer latex having a solid content of 45% and a pH of 8.5.

As a result of analysis of latex, the latex was determined to have a glass transition temperature of −23° C. and an average particle diameter of 130 nm. Hereinafter, the latex thus prepared will be referred to as "latex-B".

Then, starch (Ecosphere produced by Ecosynthetics Ltd.) having a low viscosity at a high concentration was prepared at a concentration of 30% by weight and had a viscosity of 35 cPs at 50° C. The starch will be referred to as "starch-B".

The latex-B and the starch-B were mixed at a ratio of 9:1 to prepare a mixture.

A glove-shaped dip-molded article was produced in the same manner as in Example 1 and physical properties thereof are shown in Table 1 below.

Example 3

A glove-shaped dip-molded article was produced in the same manner as in Example 1 except that the latex-A and the starch-A were mixed at a ratio of 98:2 and physical properties thereof are shown in Table 1 below.

Example 4

A glove-shaped dip-molded article was produced in the same manner as in Example 1 except that the latex-A and the starch-A were mixed at a ratio of 85:15 and physical properties thereof are shown in Table 1 below.

Example 5

A glove-shaped dip-molded article was produced in the same manner as in Example 1 except that the latex-A and the starch-B were mixed at a ratio of 9:1 and physical properties thereof are shown in Table 1 below.

Example 6

A glove-shaped dip-molded article was produced in the same manner as in Example 1 except that the latex-B and the starch-A were mixed at a ratio of 9:1 and physical properties thereof are shown in Table 1 below.

Example 7

A glove-shaped dip-molded article was produced in the same manner as in Example 1 except that the latex-A and the starch-A were mixed at a ratio of 8:2 and physical properties thereof are shown in Table 1 below.

Example 8

A glove-shaped dip-molded article was produced in the same manner as in Example 1 except that the latex-B and the starch-B were mixed at a ratio of 8:2 and physical properties thereof are shown in Table 1 below.

Comparative Example 1

A glove-shaped dip-molded article was produced in the same manner as in Example 1 except that the latex-A was used alone and physical properties thereof are shown in Table 1 below.

Comparative Example 2

A glove-shaped dip-molded article was produced in the same manner as in Example 1 except that the latex-B was used alone and physical properties thereof are shown in Table 1 below.

TABLE 1

|  | Syneresis (Sec.) | Stickiness (scale of 1 to 10) | Tensile strength (MPa) |
| --- | --- | --- | --- |
| Example 1 | 183 | 8 | 27.1 |
| Example 2 | 128 | 9 | 33.1 |
| Example 3 | 95 | 7 | 24.7 |
| Example 4 | >240 | 10 | 25.0 |
| Example 5 | 154 | 9 | 28.4 |
| Example 6 | 121 | 9 | 33.9 |
| Example 7 | >240 | 10 | 19.5 |
| Example 8 | >240 | 10 | 21.3 |
| Comparative Example 1 | 41 | 3 | 25.3 |
| Comparative Example 2 | 55 | 2 | 32.2 |

As can be seen from results shown in Table 1 above, the dip-molded articles (Examples 1 to 8) produced from the latex composition comprising the mixture of the carboxylic acid-modified nitrile latex and starch have low syneresis, less stickiness and superior tensile strength, as compared to dip-molded articles produced in Comparative Examples 1 and 2.

What is claimed is:

1. A latex composition for dip molding comprising:
    a carboxylic acid-modified nitrile copolymer latex having a solid content of 20 to 70% by weight;
    an aqueous starch solution having a viscosity of 300 cPs or less when measured at a temperature of 50° C. and an aqueous solution concentration of 30% by weight, and
    a pH controller,
    wherein the carboxylic acid-modified nitrile copolymer latex and the aqueous starch solution are present in a weight ratio of 90:10 to 98:2, and
    wherein the latex composition for dip molding has a solid content of 5 to 40% by weight and a pH of 9.3 to 10.5, such that a resulting dip-molded article has a syneresis of 95 to 183 seconds, and a tensile strength of 24.7 to 33.9 MPa, and wherein the carboxylic acid-modified nitrile copolymer latex consists of 50 to 78% by weight of a conjugated diene monomer, 20 to 40% by weight of an ethylenically unsaturated nitrile monomer, and a remainder of ethylenically unsaturated acid based on the total weight of the monomers constituting the carboxylic acid-modified nitrile copolymer.

2. The latex composition for dip molding according to claim 1, wherein the carboxylic acid-modified nitrile copolymer latex has a glass transition temperature of −50° C. to −15° C. and an average particle diameter of 50 nm or more.

3. The latex composition for dip molding according to claim 1, wherein the aqueous starch solution comprises a mixture containing 0 to 40% by weight of amylose and 60 to 100% by weight of amylopectin.

4. The latex composition for dip molding according to claim 1, wherein the conjugated diene monomer comprises at least one selected from the group consisting of 1,3-butadiene, 2,3-dimethyl-1,3-butadiene, 2-ethyl-1,3-butadiene, 1,3-pentadiene and isoprene.

5. The latex composition for dip molding according to claim 1, wherein the ethylenically unsaturated nitrile monomer comprises at least one selected from the group consisting of acrylonitrile, methacrylonitrile, fumaronitrile, α-chloronitrile and α-cyanoethylacrylonitrile.

6. The latex composition for dip molding according to claim 1, wherein the ethylenically unsaturated acid monomer comprises at least one selected from the group consisting of acrylic acid, methacrylic acid, itaconic acid, maleic acid, fumaric acid, maleic anhydride, citraconic anhydride, styrenesulfonic acid, monobutyl fumarate, monobutyl maleate and mono-2-hydroxypropyl maleate.

7. The latex composition for dip molding according to claim 1, further comprising one or more additives selected from the group consisting of a vulcanizing agent, an ionic crosslinking agent, a pigment, a vulcanizing accelerator, a filler, and a thickener.

8. A dip-molded article produced by dip molding the latex composition for dip molding according to claim 1.

9. A method for producing a dip-molded article comprising:
   a) applying a coagulant solution to a mold, followed by drying;
   b) applying the latex composition for dip molding according to claim 1 to the coagulant-applied mold to form a dip-molded layer;
   c) cross-linking the dip-molded layer; and
   d) peeling the cross-linked dip-molded layer from the mold to obtain a dip-molded article.

* * * * *